United States Patent [19]

Scheffler

[11] 3,933,186

[45] Jan. 20, 1976

[54] PROTECTIVE HOUSING FOR A LIQUID SAMPLE CONTAINER

[75] Inventor: Norman E. Scheffler Midland, Mich.

[73] Assignee: The Dow Chemical Company, Midland, Mich.

[22] Filed: Dec. 3, 1973

[21] Appl. No.: 421,210

[52] U.S. Cl. ........................ 141/97; 53/86; 137/377

[51] Int. Cl.[2] .......................... B65H 3/18; F16P 1/00

[58] Field of Search ........... 53/86; 137/377; 141/45, 141/51, 59, 93, 97, 268, 369, 370, 390, 88

[56] References Cited

UNITED STATES PATENTS

| | | | |
|---|---|---|---|
| 61,627 | 1/1867 | Matthews, Jr. | 141/97 |
| 512,065 | 1/1894 | Spalding | 141/370 |
| 870,103 | 11/1907 | Higginson | 141/97 X |
| 915,364 | 3/1909 | Landau | 141/97 |
| 1,466,722 | 9/1923 | Huntley | 141/97 |

FOREIGN PATENTS OR APPLICATIONS

| | | | |
|---|---|---|---|
| 2,861 | 12/1897 | United Kingdom | 141/97 |

*Primary Examiner*—Richard E. Aegerter
*Assistant Examiner*—Fredrick R. Schmidt
*Attorney, Agent, or Firm*—V. Dean Clausen; Lloyd S. Jowanovitz

[57] ABSTRACT

Disclosed is a protective housing unit for a liquid sample container. Basic components include an outer housing member and an inner housing member, which are defined by cylindrical sections. The outer member has an open top, an opening in the side wall, and a bottom which connects to a drain line. Positioned within the outer member is a plate for supporting a liquid sample container, such as a bottle. The inner member has an open top, an open bottom, and an opening in the side wall. Also, the inner member is adapted to fit down into the outer member and to rotate within the outer member. A liquid sample is directed into the container through a fill pipe, which connects to an inlet line and which extends through the top of the inner member and down into the container. During filling, the sample container can be completely enclosed by rotating the inner member to mis-align the side wall openings in each member. After filling, the inner member is rotated to a position which aligns the openings, to permit removal of the container.

1 Claim, 1 Drawing Figure

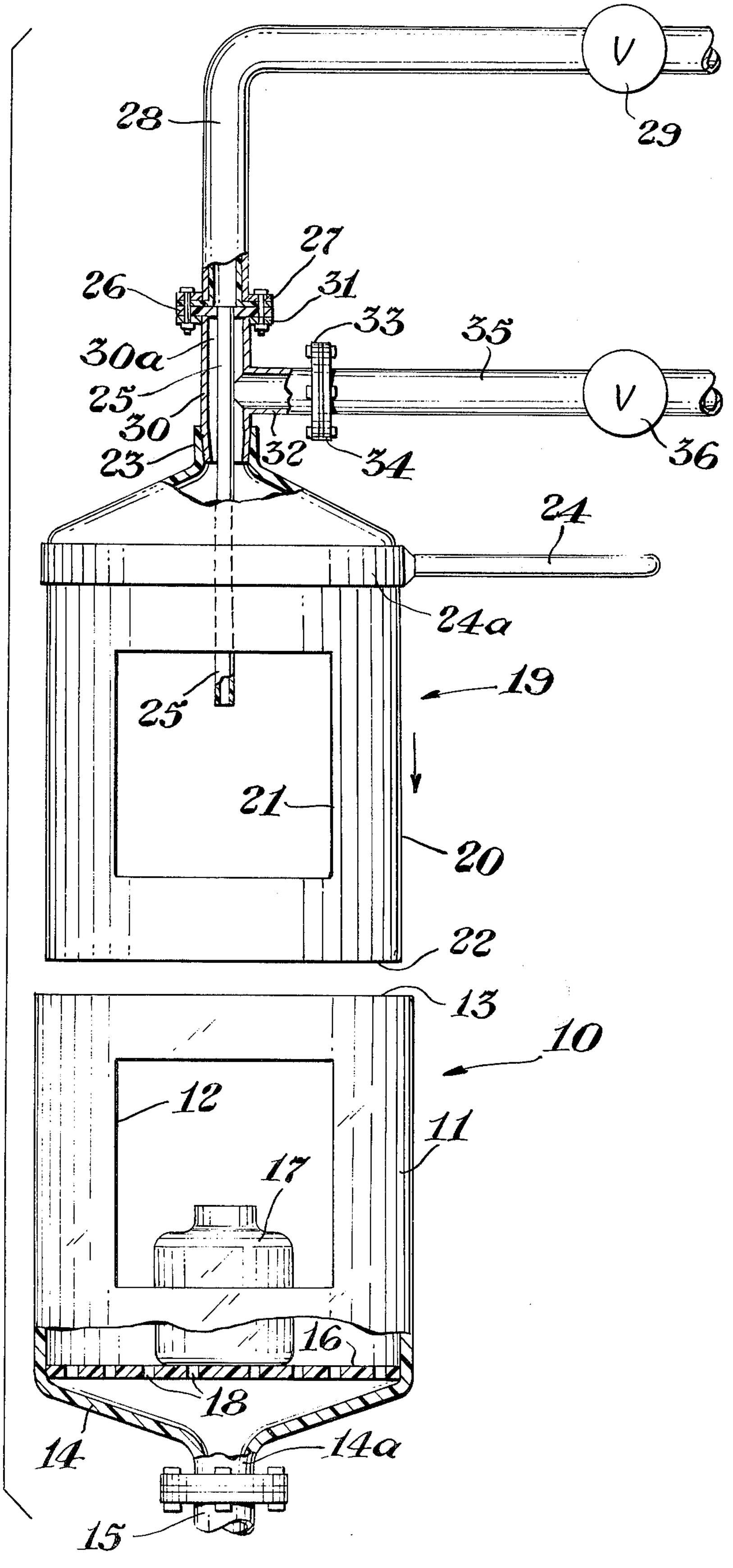
28
29
V
27
26
31
33
35
30a
25
30
V
23
32
34
36
24
24a
19
25
21
20
22
13
10
12
11
17
16
18
14
14a
15

PROTECTIVE HOUSING FOR A LIQUID SAMPLE CONTAINER

BACKGROUND OF THE INVENTION

This invention relates to containers for obtaining liquid samples. More specifically, the invention describes a protective housing unit for a liquid sample container.

In a chemical plant it is an every day routine to sample various liquid chemicals for product analysis. A common technique for collecting the sample is for an operator to manually drain a small amount of the liquid from a line or a tank into a container, such as a bottle. Frequently, the sample is a highly corrosive and/or a toxic material, which is obtained directly from an open line at a point immediately beyond a sample valve. There are obvious disadvantages in obtaining samples of hazardous chemicals from an open line. For example, the operator must frequently wear special clothing and equipment to protect himself from escaping vapors and spilled liquid.

One attempt to make this procedure safer has involved enclosing the sample container in a rectangular box. On one side the box has a hinged door, for removing the sample container. The door also includes a window for observing filling of the container. These box enclosures are usually constructed of heavy rigid materials, such as wood, metal alloys, or heavy plastic resin materials. A major disadvantage of this type of enclosure is the high cost of the construction. Another drawback is that fabrication of the enclosure is difficult and time-consuming.

SUMMARY OF THE INVENTION

The protective housing unit of this invention comprises basically an outer housing member and an inner housing member, defined by cylindrical sections which have a single side wall. The outer section has an open top, an opening in the side wall, and the bottom is adapted to connect into a drain line. A support plate, for holding a sample container, is positioned inside the outer section, near the bottom. The inner section has an open top and open bottom and an opening in the side wall. Also, the inner section is of smaller diameter than the outer section, so that it can fit down into the outer section and rotate within the outer section.

The housing unit includes a fill pipe for directing a liquid sample into the container. The fill pipe is connected at its upper end to an inlet line and the lower end extends down through the top of the inner section and into the container. When the container is being filled, it can be completely enclosed by rotating the inner section such that the side wall openings in the inner and outer sections are out of alignment. To remove the container after filling, the inner section is rotated to a position such that the side wall openings in each section are in alignment.

DESCRIPTION OF THE DRAWING

The single FIGURE shown herein is an exploded view, partly in section, of one embodiment of a protective housing unit and sample container according to this invention.

DESCRIPTION OF A PREFERRED EMBODIMENT

Referring to the drawing, one of the basic components of the protective housing unit comprises an outer housing member, as indicated generally by numeral 10. The outer housing member 10 is defined by a cylindrical section, preferably constructed of a transparent material. The member 10 has a single side wall 11, which includes a rectangular opening 12. In addition, the member 10 includes an open top 13 and a closed bottom 14, which is adapted for connection into a drain. In the embodiment shown herein the bottom 14 is specifically defined by a neck portion 14a, which is coupled to the drain conduit 15 by a flange connection.

A support plate 16 is positioned within the outer housing member 10 near the bottom 14. The purpose of plate 16 is to support a container 17, such as a glass bottle, which is adapted for collecting a liquid sample. Plate 16 includes several perforations 18, which serve as drain holes for liquid which might be spilled onto plate 16. Another basic component of the protective housing unit is provided by an inner housing member, indicated generally by numeral 19. Inner housing member 19 is defined by a cylindrical section which, preferably, is also constructed of a transparent material. It is desirable that both the outer housing member 10 and the inner housing member 19 be fabricated of a transparent material. This requirement is not critical, however, as will be explained later in this text.

Member 19 is further defined by a single side wall 20, with a rectangular opening 21 therein. As shown, the inner housing member 19 has an open bottom 22 and the top is preferably defined by a neck portion 23, which is open. The outer diameter of side wall 20 of housing member 19 is slightly smaller than the inner diameter of side wall 11 of outer housing member 10. This construction enables the inner housing member 19 to be fitted down into the outer housing member 10, so that the member 19 will rotate within member 10. The purpose of adapting the inner housing member 19 to rotate within the outer housing member 10 will be explained later in this description. The preferred means for rotating the member 19 is for the operator to grasp the handle member 24 and rotate the member 19. As shown, the handle 24 is fastened to the upper part of member 19 by a band or other suitable fastening means.

A fill pipe 25 provides means for filling the sample bottle 17 with the liquid to be sampled. More specifically, the fill pipe 25 is made up of a small diameter open end pipe, which includes a flange fitting 26 at the upper end of the pipe. The flange 26 on pipe 25 mates with a similar flange 27 to connect the upper end of pipe 25 into a liquid inlet line 28. The lower end of pipe 25 thus extends down into the inner housing member 19 through the open neck 23. A valve 29 is installed in line 28 above the flange connection with fill pipe 25. Valve 29 is for the purpose of regulating flow of liquid into the sample container 17.

As shown in the drawing, the open neck 23 of inner housing member 19 is coupled to the inlet line 28 by a tee fitting 30. Specifically, the upper end of tee fitting 30 has a flange 31, which mates with flange 26 on fill pipe 25. The lower end of tee fitting 30 seats down into the open neck 23, so that the tee fitting forms a loose friction fit with the inner housing member 19. The branch 32 of fitting 30 includes a flange 33. Flange 33 mates with a similar flange to connect branch 32 into a vent line 35.

Referring again to the drawing, it will be noted that a common connection is formed by the flange 31 on tee fitting 30, the flange 26 on filler nozzle 25, and the flange 27 on inlet line 28. By connecting the fill pipe 25 in this manner the pipe is fitted within the bore of tee fitting 30, so that an annular passage 30a is formed between the pipe and the tee fitting. The passageway 30a provides a means for directing escaping vapors from sample container 17 through the branch line 32 and into the vent line 35. A valve 36 installed in the vent line 35 provides means for opening and closing this line.

The intended use for the protective housing of this invention is in a liquid sampling operation. A typical sampling operation will now be described to illustrate the practice of the invention. In operating position, the inner housing member 19 is fitted down into the outer housing member 10, such that the bottom edge 22 of member 19 rests on support plate 16 of member 10. The inner member 19 is then rotated so that the opening 21 is aligned with opening 12 in the outer member 10. The empty sample container 17 is then placed on support plate 16 by inserting it through the aligned openings 12 and 21. The inner member 19 is then rotated either left or right, far enough so that the opening 21 in member 19 does not align with opening 12 in member 10. Rotation of the inner member thus seals the openings in both members, which prevents the liquid from splashing outside the protective housing and also prevents the escape of the vapors into the atmosphere.

In a typical installation, the line 28 is usually connected directly into a tank or another line, which contains the liquid product to be sampled. For simplicity in the drawing the tank or line into which inlet 28 is connected is not shown. When in operating position, the fill pipe 25 extends down into the neck of container 17. By opening valve 29, therefore, a portion of the liquid is allowed to drain into container 17. The amount of liquid directed into container 17 can be regulated by observing the liquid level through the walls of the housing members 10 and 19, if both members are fabricated of a transparent material. If one housing member is fabricated of a non-transparent material, the filling of container 17 can be observed through the opening (either 12 or 21) of the non-transparent member and the transparent wall of the other member.

Once the sample container 17 is filled, the inner housing member 19 can be rotated back to a position in which the opening 21 will line up with the opening 12 in outer housing member 10. The aligned openings thus provide an access port for removing the sample container from the protective housing. If container 17 should overflow while being filled, the excess liquid will drain through holes 18 in support plate 16 and down into the drain pipe 15. To avoid waste, the liquid which drains into pipe 15 is usually recirculated back into the tank or line from which the sample was withdrawn. Alternatively, the drain pipe 15 may be connected into a waste sewer (not shown) or other disposal system. In the usual installation the outer housing member 10 will be fastened to a suitable support (not shown), so that it sits above the ground level or floor level at a convenient working height.

The protective housing of this invention has certain advantages not found in the prior protective enclosures. One advantage is that the interior of the housing unit can be easily cleaned when it becomes contaminated with coated material from liquid spills or from particulate matter. For example, in a typical sampling operation the inner member 19 will be contaminated more readily than the outer member 10. Member 19 can be easily removed for cleaning by disconnecting the inlet line 28 at valve 29 and vent line 35 at valve 36. This enables the entire piping assembly comprising tee fitting 30, inlet line 28 and vent line 35, to be lifted free of inner member 19.

The member 19 can then be pulled upward out of the outer housing member 10 and immersed in a cleaning solution, or sprayed or scrubbed with a cleaning solution. Alternatively, the contaminated housing member can be discarded, and replaced with a new member, since the cost of this component is nominal. Also, once the inner member 19 is separated from the outer member 10, the outer member can be easily cleaned or discarded, as desired. Another advantage is that additional lighting, such as a light bulb, can be set up behind the outer member 10 if more light is needed to observe filling of sample container 17. This is made possible because of the transparent properties of the housing unit.

Various structural details of some components of the protective housing unit will now be described. Regarding the outer housing member 10 and inner housing member 19, the preferred materials of construction are plastic resins. The general requirements are that the plastic resin should be a material which is rigid, chemically inert, thermally stable, and transparent. Fabrication of the plastic resin housing members can be done by various techniques such as blow molding, vacuum forming, or injection molding. Plastic materials which are particularly suitable for blow molding fabrication include polyvinyl chloride, polyvinylidene chloride, polyethylene, polypropylene, polycarbonate, polymethylpentene and fluorinated polyethylene-propylene, (Teflon FEP). Other suitable thermoplastic resins include cellulosic plastics, methacrylates, and other vinyl plastics.

For the inlet line 28, the vent line 35 and the drain line 15, it is preferred to use steel pipe lined with a plastic resin material, such as a Teflon (brand) resin. A preferred material for the fill pipe 25, including flange 26, is also a Teflon (brand) resin. Suitable materials for the support plate 16 include plastic resin materials, such as those mentioned above, metal alloys or porcelain. The vent tee fitting 30 can be constructed of plastic-lined steel pipe or suitable metals, or metal alloys. In practice, the protective housing unit of this invention may be used to enclose a container in which various organic or inorganic liquids are collected. For example, this housing unit might be employed in conjunction with sampling of liquids such as chloroacetic acid, o-sec-butylphenol and hydrochloric acid.

The invention claimed is:

1. A protective housing unit for a liquid sample container, which comprises the combination of:

an outer housing section defined by a cylindrical section which has a single side wall, an open top, a bottom which connects into a drain line, and an opening in the side wall;

a support plate for supporting a liquid sample container, the plate being positioned within the outer housing section near the bottom of the section;

an inner housing section defined by a cylindrical section which has a single side wall, an open bottom, an open top, and an opening in the side wall, the inner section being positioned within the outer housing section, and the inner section being rotatable within the outer housing section;

a tee fitting which has an upper end in communication with a liquid inlet line, which has a lower end in communication with the open top of the inner housing section, and which has a branch end in communication with a vent line;

a fill pipe which is positioned lengthwise within the tee fitting, such that an annular space is defined between the fill pipe and the tee fitting, the fill pipe having an open upper end in communication with the liquid inlet line and an open lower end which extends into the sample container, the annular space defining a passageway for diverting vapors from the sample container into the vent line;

the inner housing section being rotatable to a first position which will seal the opening in the outer housing section and enclose the sample container, and to a second position in which the opening of the inner housing section will be in alignment with the opening of the outer housing section, to permit the sample container to be inserted and removed from the said housing unit.

* * * * *